US007489640B2

(12) United States Patent
Corley

(10) Patent No.: US 7,489,640 B2
(45) Date of Patent: Feb. 10, 2009

(54) PROCESSOR WITH CONTINUITY CHECK CACHE

(75) Inventor: Robert A. Corley, Cedar Park, TX (US)

(73) Assignee: Agere Systems Inc., Allentown, PA (US)

( * ) Notice: Subject to any disclaimer, the term of this patent is extended or adjusted under 35 U.S.C. 154(b) by 1056 days.

(21) Appl. No.: 10/675,718

(22) Filed: Sep. 30, 2003

(65) Prior Publication Data

US 2005/0086392 A1    Apr. 21, 2005

(51) Int. Cl.
    *H04J 1/16*    (2006.01)
(52) U.S. Cl. .................. 370/241.1; 370/242; 370/236.2
(58) Field of Classification Search ................ 370/242, 370/250, 394, 426, 465, 395.1, 229, 241.1
    See application file for complete search history.

(56) References Cited

U.S. PATENT DOCUMENTS

| | | | | |
|---|---|---|---|---|
| 5,353,326 | A * | 10/1994 | Jung ........................ 379/22.03 |
| 5,872,770 | A * | 2/1999 | Park et al. ................. 370/241.1 |
| 5,878,041 | A * | 3/1999 | Yamanaka et al. ...... 370/395.65 |
| 5,894,470 | A * | 4/1999 | Kim et al. .................... 370/229 |
| 5,909,428 | A * | 6/1999 | Saito et al. ................... 370/244 |
| 5,973,868 | A * | 10/1999 | Kanota et al. ................. 360/48 |
| 6,505,293 | B1 * | 1/2003 | Jourdan et al. .............. 712/217 |
| 6,667,978 | B1 * | 12/2003 | Delp et al. ................ 370/395.1 |
| 6,674,541 | B1 * | 1/2004 | Kamiyama et al. .......... 358/1.15 |
| 6,754,662 | B1 * | 6/2004 | Li ................................ 707/101 |
| 6,785,733 | B1 * | 8/2004 | Mimura et al. .............. 709/236 |
| 6,859,824 | B1 * | 2/2005 | Yamamoto et al. .......... 709/217 |
| 6,865,183 | B1 * | 3/2005 | Fahmi .................... 370/395.31 |
| 7,088,674 | B2 * | 8/2006 | MacKiewich et al. ....... 370/225 |
| 2001/0002481 | A1 * | 5/2001 | Itoh et al. .................... 711/167 |
| 2002/0091915 | A1 * | 7/2002 | Parady ....................... 712/225 |
| 2002/0186654 | A1 * | 12/2002 | Tornar ........................ 370/225 |
| 2004/0146044 | A1 * | 7/2004 | Herkerdorf et al. ......... 370/351 |
| 2004/0218534 | A1 * | 11/2004 | Song et al. ............... 370/236.2 |
| 2005/0180331 | A1 * | 8/2005 | Fujita ....................... 370/241.1 |
| 2006/0120295 | A1 * | 6/2006 | Scholtens et al. ........... 370/248 |
| 2006/0239296 | A1 * | 10/2006 | Jinzaki et al. ............... 370/468 |
| 2006/0269060 | A1 * | 11/2006 | Candelore et al. ........... 380/239 |
| 2007/0127382 | A1 * | 6/2007 | Hussain et al. .............. 370/235 |

* cited by examiner

*Primary Examiner*—Huy D Vu
*Assistant Examiner*—Abdullah Riyami
(74) *Attorney, Agent, or Firm*—Ryan, Mason & Lewis, LLP

(57) ABSTRACT

A processor includes controller circuitry operative to control the performance of a continuity check for each of a plurality of flows of protocol data units (PDUs) received by the processor. The controller circuitry is further operative to control access to a set of continuity check counters comprising a counter for each of the plurality of flows. The processor stores an identifier for each of a subset of the plurality of flows in a continuity check cache, and determines if a given flow for which a PDU is received in the processor has a corresponding entry in the continuity check cache. If the given flow has such an entry, the processor prevents a corresponding one of the continuity check counters from being updated, and if the given flow does not have such an entry, the processor clears the corresponding one of the continuity check counters and stores a flow identifier for the given flow in the continuity check cache.

19 Claims, 3 Drawing Sheets

PROCESSOR WITH CONTINUITY CHECK CACHE

FIELD OF THE INVENTION

The present invention relates generally to data communication devices and systems, and more particularly to network processors or other types of processors utilizable in conjunction with processing operations, such as routing or switching, performed on packets or other protocol data units (PDUs).

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

Certain network processors may be configured to support the processing of a variety of different types of data traffic, such as ATM cells, Internet Protocol (IP) packets, as well as other types of packet-based traffic. The ATM traffic is typically in the form of fixed-length 53-byte cells, each including a 5-byte header and a 48-byte payload, while the IP traffic generally comprises variable-length packets. ATM cells and IP packets may be viewed as examples of what are more generally referred to herein as PDUs.

Operation, administration and maintenance (OAM) functions within the network processor may be provided in accordance with an established protocol, such as ITU-T Recommendation I.610, "B-ISDN Operation and Maintenance Principles and Functions," February 1999, which is incorporated by reference herein.

One type of OAM function relates to continuity checking of network connections. For example, the I.610 Recommendation provides such a continuity check in the ATM context by requiring that a given connection be monitored for incoming user cells, and that a timeout be reported if no cell is received for a period of 3.5 seconds +/−0.5 seconds. Such a connection is an example of what is more generally referred to herein as a "flow." A number of other OAM standards, such as those that are currently evolving for multi-protocol label switching (MPLS), provide a similar continuity check mechanism.

A problem associated with the provision of OAM functionality in a network processor is that the above-described continuity check is typically implemented in a manner that either consumes an excessive amount of on-chip memory, that is, memory internal to the network processor, or requires an unduly large number of accesses to a memory external to the network processor. These conditions negatively impact the network processor in terms of factors such as size, complexity, power consumption and cost, while also limiting processor throughput performance.

Accordingly, a need exists for an improved technique for implementing a continuity check in a network processor.

SUMMARY OF THE INVENTION

The invention provides improved continuity check techniques for processing received cells, packets or other PDUs in a network processor or other type of processor, in a manner that does not consume excessive internal memory resources or require an unduly large number of external memory accesses.

In accordance with one aspect of the invention, a network processor or other type of processor includes controller circuitry operative to control the performance of a continuity check for each of a plurality of flows of PDUs received by the processor. The controller circuitry is further operative to control access to a set of continuity check counters comprising a counter for each of the plurality of flows.

The processor stores an identifier for each of a subset of the plurality of flows in a continuity check cache, and determines if a given flow for which a PDU is received in the processor has a corresponding entry in the continuity check cache. If the given flow has such an entry, the processor prevents a corresponding one of the continuity check counters from being updated, and if the given flow does not have such an entry, the processor clears the corresponding one of the continuity check counters and stores a flow identifier for the given flow in the continuity check cache.

In an illustrative embodiment, each of the flows for which a flow identifier is stored in the continuity check cache has had its corresponding continuity check counter cleared upon receipt of a first PDU for that flow within a specified time window. As a result, a continuity check performed for the given flow requires that the corresponding continuity check counter be reset only once during a specified time window, even if a plurality of PDUs are received by the processor for the given flow within that time window.

The processor may be configured as a network processor integrated circuit to provide an interface between a network and a switch fabric in a router or switch.

Advantageously, the techniques of the invention in the illustrative embodiment process received PDUs in a manner that substantially reduces the number of external memory accesses required in conjunction with the performance of continuity checks, while also limiting the amount of on-chip memory resources that are consumed. The illustrative embodiment provides an efficient mechanism for allowing a large number of continuity check counters in external memory to be reset without unnecessarily wasting memory bandwidth or sacrificing on-chip area. As a result, processor throughput performance is considerably improved, without significantly increasing the size, complexity, power consumption or cost of the processor.

DETAILED DESCRIPTION OF THE INVENTION

The invention will be illustrated herein in conjunction with an exemplary information processing system which includes a network processor configured in a particular manner. It should be understood, however, that the invention is more generally applicable to any processor in which it is desirable to provide more efficient continuity checking than is possible using the conventional techniques described above.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

The term "controller circuitry" as used herein is intended to include any portion of a processor or other type of logic or processing circuitry which is capable of performing or otherwise controlling at least a portion of an operation associated with a continuity check.

The term "memory circuitry" as used herein is intended to include a separate memory as well as a particular portion of a larger memory, and may refer to internal memory, external memory or combinations thereof.

The terms "protocol data unit" and "PDU" as used herein are intended to include a cell, a packet, or other identifiable grouping of information.

The present invention in an illustrative embodiment is configured such that a network processor includes controller circuitry configurable to control processing operations associated with performance of continuity checks for multiple flows received by the network processor.

Figure 1:
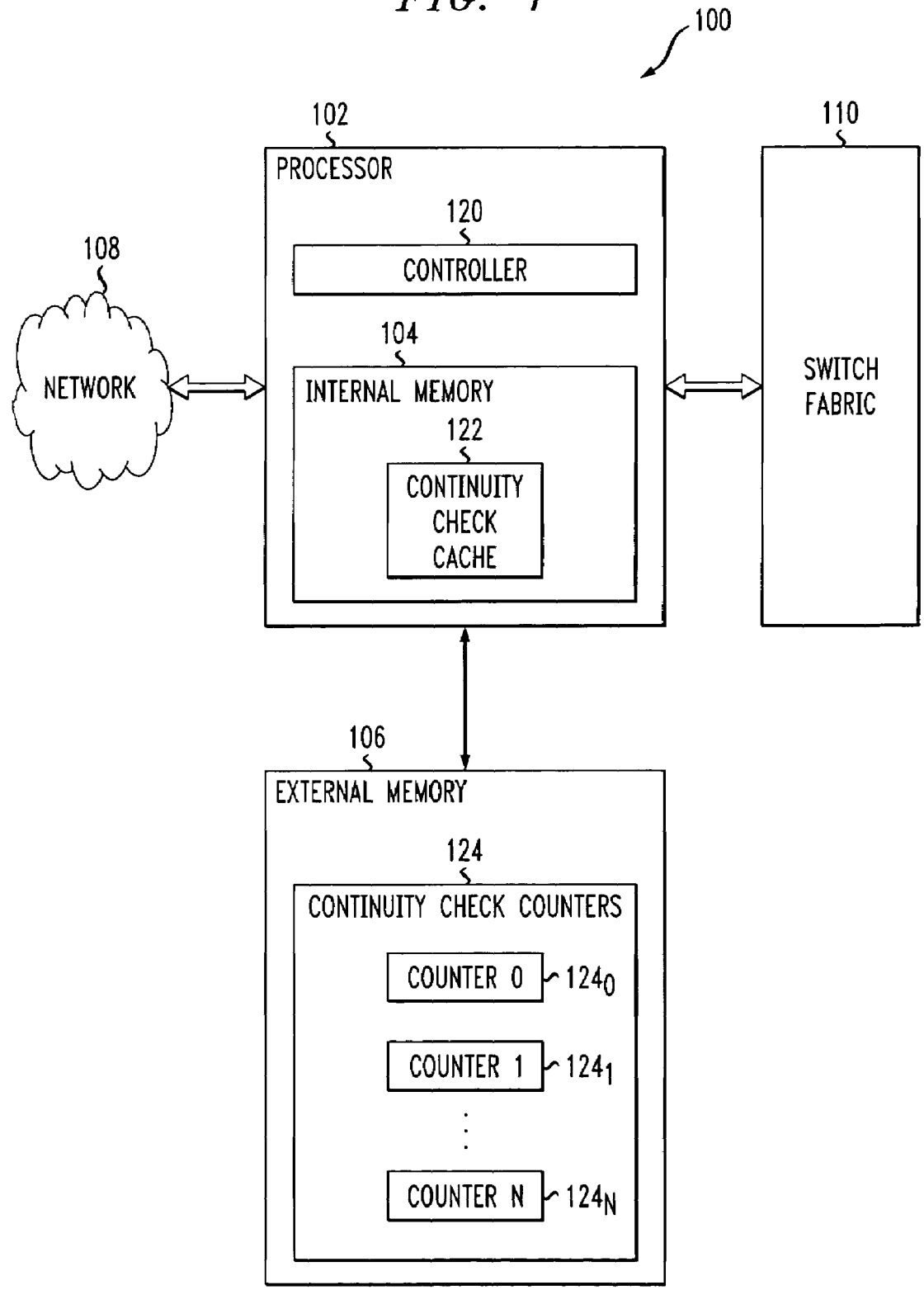
FIG. 1 is a simplified block diagram of an information processing system in which the present invention is implemented.

FIG. 1 shows an information processing system 100 in which the invention is implemented. The system 100 includes a network processor 102 having an internal memory 104. The network processor 102 is coupled to an external memory 106 as shown, and is configured to provide an interface between a network 108 from which PDUs are received and a switch fabric 110 which controls switching of PDU data. The processor 102 and its associated external memory 106 may be implemented, e.g., as one or more integrated circuits installed on a line card or port card of a router or switch. In such a configuration, the switch fabric 110 is generally considered to be a part of the router or switch.

One or both of the internal and external memories 104, 106 may be utilized to implement otherwise conventional network processor memory elements such as PDU buffer memory, queuing and dispatch buffer memory, etc.

In accordance with an aspect of the invention, the network processor 102 includes controller circuitry comprising a controller 120. In addition, the internal memory 104 includes a continuity check cache 122, and the external memory 106 includes a set 124 of continuity check counters comprising individual counters $124_0$, $124_1$, . . . $124_N$, also denoted Counter 0, Counter 1, . . . Counter N, respectively. Each of the counters corresponds generally to a particular identifiable network connection or other type of flow for which PDUs may be received and processed by the network processor. The value of N is purely arbitrary, and may take on any value that is implementable in a given processor. An exemplary value of N in a typical network processor may be on the order of 256K; or 262, 144, although other values can of course be used.

Generally, the continuity check cache 122 includes substantially less than N entries, with each of the entries at any given point in time corresponding generally to a particular one of the N counters of the continuity check counters 124, as will be further described in conjunction with FIG. 2 below.

By way of example, the continuity check cache 122 in the illustrative embodiment in which N=256K may include only eight entries. Other larger or smaller numbers of entries may also be used, such as 16, 32, etc. The invention does not require any particular relationship between the number of cache entries and the number N of continuity check counters, and the relationship can be determined in a straightforward manner for a particular implementation based on design goals and other implementation-specific factors.

Although in FIG. 1 the continuity check cache 120 is shown as being part of internal memory 104 and the set of continuity check counters 124 is shown as being part of external memory 106, this is by way of example only. Other types and arrangements of memory circuitry may be used in implementing the continuity check cache and continuity check counters, and the invention is not limited in this regard. It should be noted, however, that for large values of N, such as values on the order of 256K, it is generally preferable to store the counters in external memory, in order to conserve the on-chip memory resources of the processor.

The controller 120 is configurable for use in performing continuity checks for multiple flows received by the network processor 102, utilizing the continuity check cache 122 and the continuity check counters 124. The controller 120 may be viewed as an illustrative example of network processor controller circuitry operative to control the performance of a continuity check for each of a plurality of flows of PDUs received by the processor. The continuity check cache 122 stores an identifier for each of a subset of the plurality of flows, and the controller 120 controls access to the set 124 of continuity check counters, which as indicated previously comprise a counter for each of the plurality of flows. The controller 120 is operative to determine if a given flow for which a protocol data unit is received in the processor has a corresponding entry in the continuity check cache. If the given flow has such an entry, a corresponding one of the continuity check counters is prevented from being updated, and if the given flow does not have such an entry, the corresponding one of the continuity check counters is cleared and a flow identifier is stored for the given flow in the continuity check cache.

The terms "clear" and "reset" as used herein in the context of a counter are used interchangeably and are intended to include, by way of example and without limitation, setting the counter from a current value back to a zero count value, or setting the counter from a current value to some other non-zero value.

It will be assumed without limitation that, in the illustrative embodiment, the continuity check functionality of the network processor 102 may be provided in a manner that conforms to an established protocol, such as the above-noted ITU-T Recommendation I.610 for OAM functions. However, the invention does not require the use of this particular protocol, or any other standard protocol, and can be configured using non-standard OAM techniques as well as combinations of standard and non-standard OAM techniques.

The particular arrangement of system elements shown in FIG. 1 is by way of illustrative example only. More particularly, as previously noted, the invention can be implemented in any type of processor, and is not limited to any particular PDU processing application. Also, the system 100 and network processor 102 may include other elements in addition to or in place of those specifically shown, including one or more elements of a type commonly found in a conventional implementation of such a system and network processor. For example, the network processor may include at least one of a classifier, a scheduler, queuing and dispatch logic, and other conventional elements not explicitly shown in the figure. These and other conventional elements, being well-understood by those skilled in the art, are not described in detail herein.

It is also to be appreciated that the network processor 102 as shown in FIG. 1 is considerably simplified for purposes of illustration, and in a given embodiment may include additional circuitry, such as one or more memory controllers, as well as appropriate interface circuitry for interfacing with the network 108, the switch fabric 110, and other external devices, such as an associated host processor or other device which communicates with the network processor 102 over a standard bus architecture, e.g., a peripheral component interconnect (PCI) bus.

The continuity check functionality of the network processor 102 as described herein may be implemented at least in part in the form of software program code. For example, the controller 120 may be implemented at least in part utilizing elements that are programmable via instructions or other software that may be supplied to the network processor 102 using conventional arrangements, such as the above-noted host processor.

Figure 2:
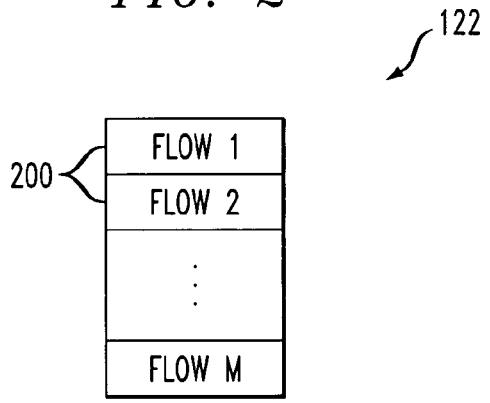
FIG. 2 shows an exemplary configuration of a continuity check cache in an internal memory of a network processor in the illustrative embodiment of the invention.

FIG. 2 illustrates one possible implementation of the continuity check cache 122 within the internal memory 104 of the network processor 102. In this example, the continuity check cache 122 includes a plurality of entries 200, with each of the entries storing a particular flow identifier. There are a total of M entries in the continuity check cache, and the entries correspond to particular ones of the counters in the set of continuity check counters 124 in external memory 106. As indicated previously, the number M of entries in the continuity check cache is generally substantially less than the number N of continuity check counters in external memory.

The flow identifiers stored in the continuity check cache comprise information identifying particular flows of PDUs that are received and processed by the network processor. These flow identifiers are illustratively shown in FIG. 2 as comprising flow identifiers Flow 1, Flow 2, ... Flow M. Such identifiers can be formatted using any of a number of conventional techniques, as will be appreciated by those skilled in the art.

As mentioned previously, performance of a continuity check in accordance with ITU-T Recommendation I.610 in the ATM context requires that a flow be monitored for incoming user cells, and that a timeout be reported if no cell is received for a period of 3.5 seconds 0.5 seconds. The present invention in the illustrative embodiment utilizes a three-bit counter for each of the continuity check counters 124 in order to implement this type of continuity check. Of course, the particular counter arrangement of the illustrative embodiment is not a requirement of the invention, and numerous alternative arrangements can be used, with other types of multi-bit counters.

Each increment of the count of a given one of the continuity check counters generally represents a specified time window within a designated period of time for which the continuity check is performed. In the case of the above-described I.610 continuity check, the time windows each have a duration of approximately 0.5 seconds, and there are seven such windows within the 3.5 second period of time for which the I.610 continuity check is performed. A three-bit counter is therefore used in the illustrative embodiment in order to allow counting of the seven intervals, with each increment of the count corresponding to a time window having a duration of approximately 0.5 seconds. The counter is incremented for each of the 0.5 second time windows for which a user cell is not received on the corresponding flow. If a user cell is received on the corresponding flow, the counter is reset to zero. If the counter reaches seven, this indicates that no cell has been received on the corresponding flow in 3.5 seconds, such that the continuity check fails and a suitable timeout indication is then generated in a conventional manner.

During normal operation, a given active flow may receive millions of user cells during the 0.5 second time window. This can be problematic in that each of the cells received on the given flow during the 0.5 second time window will cause the three-bit counter to be reset to zero. Thus, if 100 cells are received during the 0.5 second window, a processor that does not include a continuity check cache would require 100 accesses to external memory, with only the first one being useful. Since the increment for each counter in the present example only occurs once every 0.5 seconds, all of the user cells after the first one will redundantly reset the counter over and over again, which clearly wastes memory bandwidth. A possible alternative approach is to set one bit for each active flow to indicate if the counter for that flow has already been cleared during the timeout window. This prevents multiple accesses to memory for the same flow, but requires that a bit be stored in internal memory for every possible flow. In the illustrative embodiment in which N=256K, this would require 256K bits of on-chip storage, which would generally be viewed as an excessive consumption of on-chip memory resources.

The present invention advantageously addresses the above-described issues in a manner that substantially reduces the required number of external memory accesses while also limiting the amount of on-chip memory resources that are consumed. The invention in the illustrative embodiment provides an efficient mechanism for allowing a large number of continuity check counters in external memory to be reset without unnecessarily wasting memory bandwidth or sacrificing on-chip area.

Figure 3:
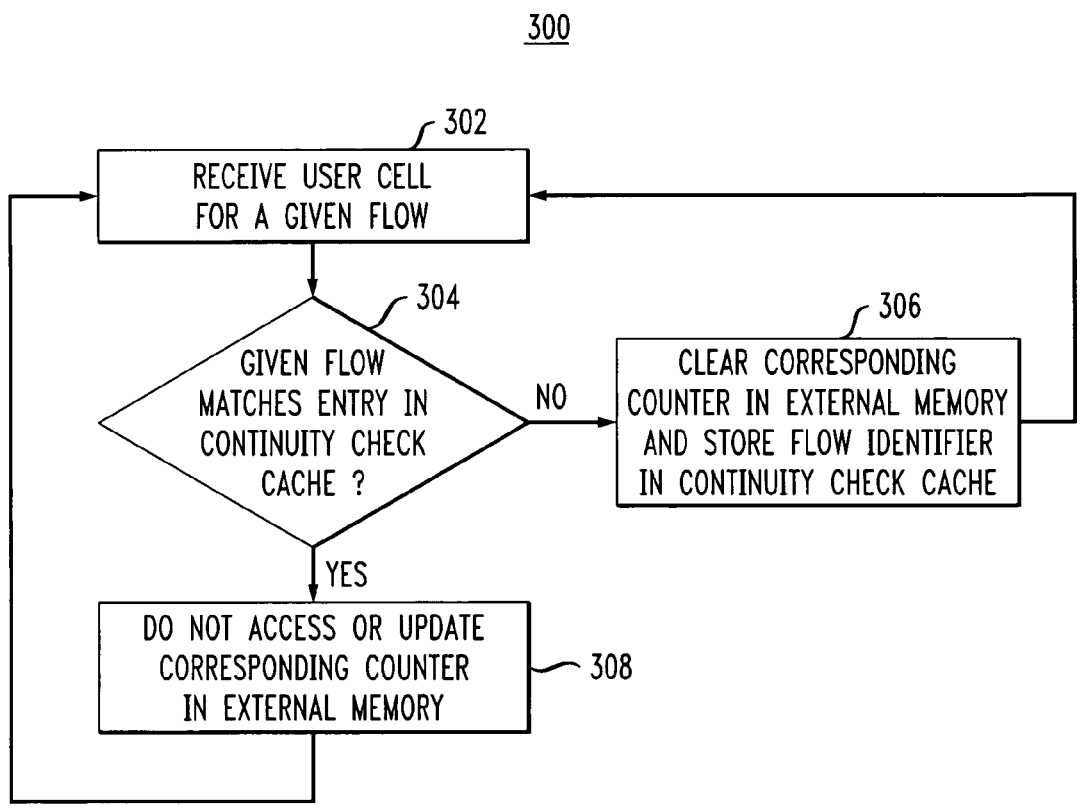
FIG. 3 is a flow diagram of continuity check operations implemented in the FIG. 1 system in accordance with the techniques of the invention.

FIG. 3 is a flow diagram 300 which illustrates the manner in which continuity checking is performed in the network processor 102 in accordance with the invention. In this example, the received PDUs are assumed to correspond to ATM cells, and the continuity check is again assumed to be performed in accordance with the I.610 protocol.

In step 302, a user cell is received for a given flow.

In step 304, a determination is made as to whether given flow matches an entry in the continuity check cache 122. That is, an identifier of the given flow is compared to the cache entries, and a determination is made as to whether or not a match exists between the identifier of the given flow and any particular cache entry. Such a match is also referred to as a cache "hit."

If there is not a hit for the given flow in the cache, this indicates that the corresponding continuity check counter in external memory has not yet been reset in the current time window. Therefore, in step 306 the corresponding continuity check counter 124 in external memory is cleared, that is, reset to zero, and an identifier of the given flow is stored in the continuity check cache. The process then returns to step 302 to process the next user cell received on the given flow or any other flow.

If there is a hit for the given flow in the cache, this indicates that the corresponding continuity check counter in external memory was already reset once in the current time window. Therefore, in step 308 the corresponding continuity check counter is not accessed or otherwise updated based on the user cell received in step 302. The process then returns to step 302 to process the next user cell received on the given flow or any other flow.

The use of the continuity check cache 122 in the manner illustrated in the FIG. 3 example prevents multiple user cells on the same continuity check flow from clearing the same counter in external memory within the 0.5 second time window.

In the illustrative embodiment, each of the flows for which a flow identifier is stored in the continuity check cache has had its corresponding continuity check counter cleared upon receipt of a first cell or other first PDU for that flow within a specified time window. Therefore, in conjunction with a continuity check performed for a given flow a corresponding one of the continuity check counters is reset only a single time for a plurality of PDUs received by the processor for the given flow within a specified time window.

Preferably, the entries of the continuity check cache 122 are cleared after expiration of each of the plurality of time windows for which the continuity check counters can be incremented. For example, in the I.610 protocol context, the continuity check cache entries are cleared after each of the 0.5 second time windows. The cache will thereby maintain a list of the particular flows for which at least one cell or other PDU has been received within the current time window of the continuity check.

The particular steps shown in FIG. 3 should be considered as examples of PDU processing operations in accordance with the illustrative embodiment of FIGS. 1 and 2, rather than as limiting the scope of the invention in any way.

A more specific example of a set of processing operations carried out in accordance with the FIG. 3 process is as follows.

1. At time=0, Counter 1 is 0.
2. At time=0.5 seconds, all counters 124 are incremented and the continuity check cache is cleared. Counter 1 is now 1.
3. At time=0.55 seconds, a new cell is received on Flow 1, which is associated with Counter 1. There is no entry in the cache for Flow 1, so Counter 1 is cleared in external memory to 0. A new entry in the cache is allocated with an identifier of Flow 1.
4. At time=0.56 seconds, another cell is received on Flow 1. Since the cache has an entry for this flow, Counter 1 is not accessed or otherwise updated in external memory. Counter 1 is still 0.
5. At time=0.57-0.99 seconds, 10 other cells are received for Flow 1 but these do not result in an access or update to Counter 1 in external memory since there is an entry in the cache for this flow. Counter 1 is still 0.
6. At time=1.0 seconds, all counters are incremented and the cache is again cleared. Counter 1 is now 1 in external memory.
7. At time=1.1 seconds, a new cell is received on Flow 1. There is no entry in the cache for Flow 1, so Counter 1 is cleared in external memory to 0. A new entry in the cache is allocated with an identifier of Flow 1, and the process repeats.

In the above example, Counter 1 reflects the correct state of 0 for a given time window in which a cell has been received, without having to access external memory for all user cells after the first one in each time window. Otherwise, there would have been 10 unnecessary memory accesses in step five to clear a counter that was already 0.

Again, this particular example is for illustrative purposes only, and should not be viewed as restricting the scope of the invention in any way.

A situation may arise in which the continuity check cache 122 is already full when a new flow arrives at the processor. In this case, a particular flow identifier may be removed from the cache to make room for storage of a flow identifier for the new flow. If an additional cell or other PDU is received for the removed flow during the current time window, this will result in an access to the corresponding counter in external memory, and an attempt to add an identifier for that flow back into the cache. The actual hit rate of the cache will generally depend on factors such as traffic burstiness and the size of the cache. For example, bursty traffic would tend have more user cells on a given flow, so the cache hit rate would tend to be higher and therefore would reduce the number of external memory accesses. The cache size can be selected in a straightforward manner to handle the expected number of outstanding flows and traffic burstiness in order to maintain a desired hit rate in the cache.

Figure 4:
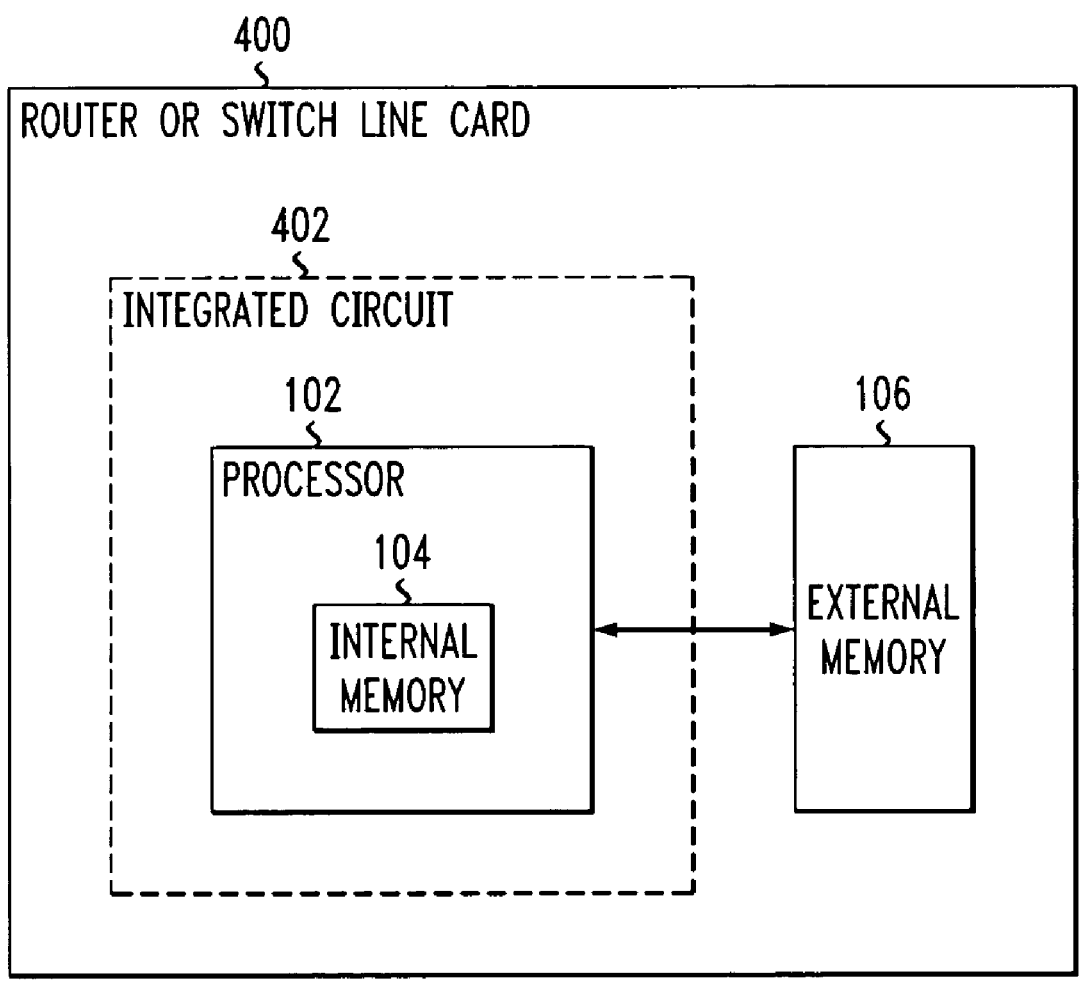
FIG. 4 illustrates one possible implementation of a network processor of the FIG. 1 system as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The external memory 106 includes the above-described continuity check counters 124, and may also be used to support other functions, for example, it may serve as an external tree memory for the network processor integrated circuit. The above-noted host processor may also be installed on the line card 400. The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

The above-described embodiments of the invention are intended to be illustrative only. For example, although the illustrative embodiment of FIG. 1 utilizes controller 120 in implementing processing operations associated with continuity checks for multiple flows, other embodiments may utilize different types of controller circuitry for implementing such operations. In addition, other embodiments can use different continuity check cache and continuity check counter configurations for implementing the described functionality. Also, the invention does not require the use of any particular flow identifier format, and such identifiers can be configured as any type of information capable of indicating at least one characteristic of a given flow. These and numerous other alternative embodiments within the scope of the following claims will be readily apparent to those skilled in the art.

What is claimed is:

1. A processor comprising:

controller circuitry operative to control performance of a continuity check for each of a plurality of flows of protocol data units received by the processor; and memory circuitry comprising a continuity check cache;

wherein the continuity check cache stores an identifier for each of a subset of the plurality of flows;

wherein the controller circuitry controls access to a set of continuity check counters comprising a counter for each of the plurality of flows;

the controller circuitry determining if a given flow for which a protocol data unit is received in the processor has a corresponding entry in the continuity check cache, and if the given flow has such an entry, preventing a corresponding one of the continuity check counters from being updated, and if the given flow does not have such an entry, clearing the corresponding one of the continuity check counters and storing a flow identifier for the given flow in the continuity check cache;

wherein the continuity check cache has a capacity of M entries, a given one of which may correspond to the flow identifier, and the set of continuity check counters includes N continuity check counters, where M is substantially less than N.

2. The processor of claim 1 wherein the memory circuitry comprises an internal memory of the processor, and the continuity check cache is implemented in its entirety within the internal memory.

3. The processor of claim 1 wherein the set of continuity check counters are stored in an external memory associated with the processor.

4. The processor of claim 1 wherein at least one of the continuity checks is performed in a manner compliant with an I.610 protocol.

5. The processor of claim 1 wherein at least one of the protocol data units comprises a cell.

6. The processor of claim 1 wherein one or more of the flows correspond to particular network connections.

7. The processor of claim 1 wherein each of the flows for which a flow identifier is stored in the continuity check cache has had its corresponding continuity check counter cleared upon receipt of a first protocol data unit for that flow within a specified time window.

8. The processor of claim 1 wherein each of the continuity check counters is configured so as to be incremented if one or more protocol data units are not received for the corresponding flow within a specified time window.

9. The processor of claim 1 wherein in conjunction with the continuity check performed for the given flow the continuity check fails and a timeout indication is generated if the corresponding continuity check counter reaches a particular value.

10. A processor comprising:
controller circuitry operative to control performance of a continuity check for each of a plurality of flows of protocol data units received by the processor; and
memory circuitry comprising a continuity check cache;
wherein the continuity check cache stores an identifier for each of a subset of the plurality of flows;
wherein the controller circuitry controls access to a set of continuity check counters comprising a counter for each of the plurality of flows;
the controller circuitry determining if a given flow for which a protocol data unit is received in the processor has a corresponding entry in the continuity check cache, and if the given flow has such an entry, preventing a corresponding one of the continuity check counters from being updated, and if the given flow does not have such an entry, clearing the corresponding one of the continuity check counters and storing a flow identifier for the given flow in the continuity check cache;
wherein in conjunction with the continuity check performed for the given flow a corresponding one of the continuity check counters is reset only a single time for a plurality of protocol data units received by the processor for the given flow within a specified time window.

11. The processor of claim 1 wherein at least one of the continuity check counters comprises a multi-bit counter with each increment of the count representing a specified time window within a designated period of time for which the continuity check is performed.

12. The processor of claim 1 wherein at least one of the continuity check counters comprises a three-bit counter with each increment of the count corresponding to a time window having a duration of approximately 0.5 seconds.

13. The processor of claim 1 wherein the entries of the continuity check cache are cleared after expiration of each of a plurality of time windows for which the continuity check counters can be incremented.

14. The processor of claim 1 wherein if the continuity check cache is full when one of the plurality of flows first arrives at the processor, a particular flow identifier from the cache is removed to make room for storage of the flow identifier for the arriving flow.

15. The processor of claim 1 wherein the processor is configured to provide an interface for communication of the received protocol data units between a network and a switch fabric.

16. The processor of claim 1 wherein the processor comprises a network processor.

17. The processor of claim 1 wherein the processor is configured as an integrated circuit.

18. A method for use in a processor comprising controller circuitry operative to control performance of a continuity check for each of a plurality of flows of protocol data units received by the processor, the controller circuitry being further operative to control access to a set of continuity check counters comprising a counter for each of the plurality of flows, the method comprising the steps of:
storing an identifier for each of a subset of the plurality of flows in a continuity check cache; and
determining if a given flow for which a protocol data unit is received in the processor has a corresponding entry in the continuity check cache, and if the given flow has such an entry, preventing a corresponding one of the continuity check counters from being updated, and if the given flow does not have such an entry, clearing the corresponding
determining if a given flow for which a protocol data unit is received in the processor has a corresponding entry in the continuity check cache, and if the given flow has such an entry, preventing a corresponding one of the continuity check counters from being updated, and if the given flow does not have such an entry, clearing the corresponding one of the continuity check counters and storing a flow identifier for the given flow in the continuity check cache;
wherein the continuity check cache has a capacity of M entries, a given one of which may correspond to the flow identifier, and the set of continuity check counters includes N continuity check counters, where M is substantially less than N.

19. An article of manufacture comprising a computer readable medium having at least one computer program encoded therein for use in a processor comprising controller circuitry operative to control performance of a continuity check for each of a plurality of flows of protocol data units received by the processor, the controller circuitry being further operative to control access to a set of continuity check counters comprising a counter for each of the plurality of flows, the at least one program when executed in the processor implementing the steps of:
storing an identifier for each of a subset of the plurality of flows in a continuity check cache; and
determining if a given flow for which a protocol data unit is received in the processor has a corresponding entry in the continuity check cache, and if the given flow has such an entry, preventing a corresponding one of the continuity check counters from being updated, and if the given flow does not have such an entry, clearing the corresponding one of the continuity check counters and storing a flow identifier for the given flow in the continuity check cache;
wherein the continuity check cache has a capacity of M entries, a given one of which may correspond to the flow identifier, and the set of continuity check counters includes N continuity check counters, where M is substantially less than N.

* * * * *